D. C. LARSON.
ALTERNATING CURRENT ELECTROMAGNET.
APPLICATION FILED DEC. 1, 1915.
1,255,441.
Patented Feb. 5, 1918.
6 SHEETS—SHEET 1.
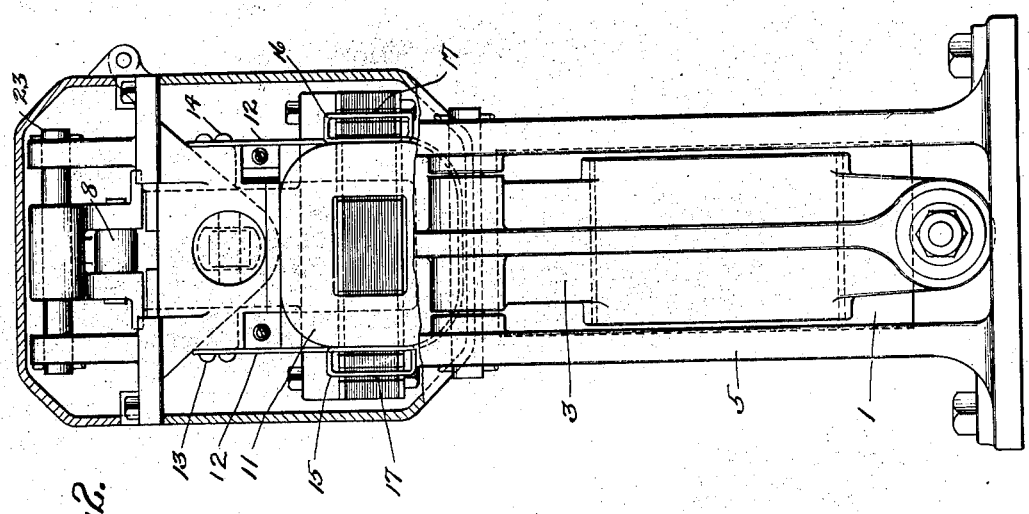
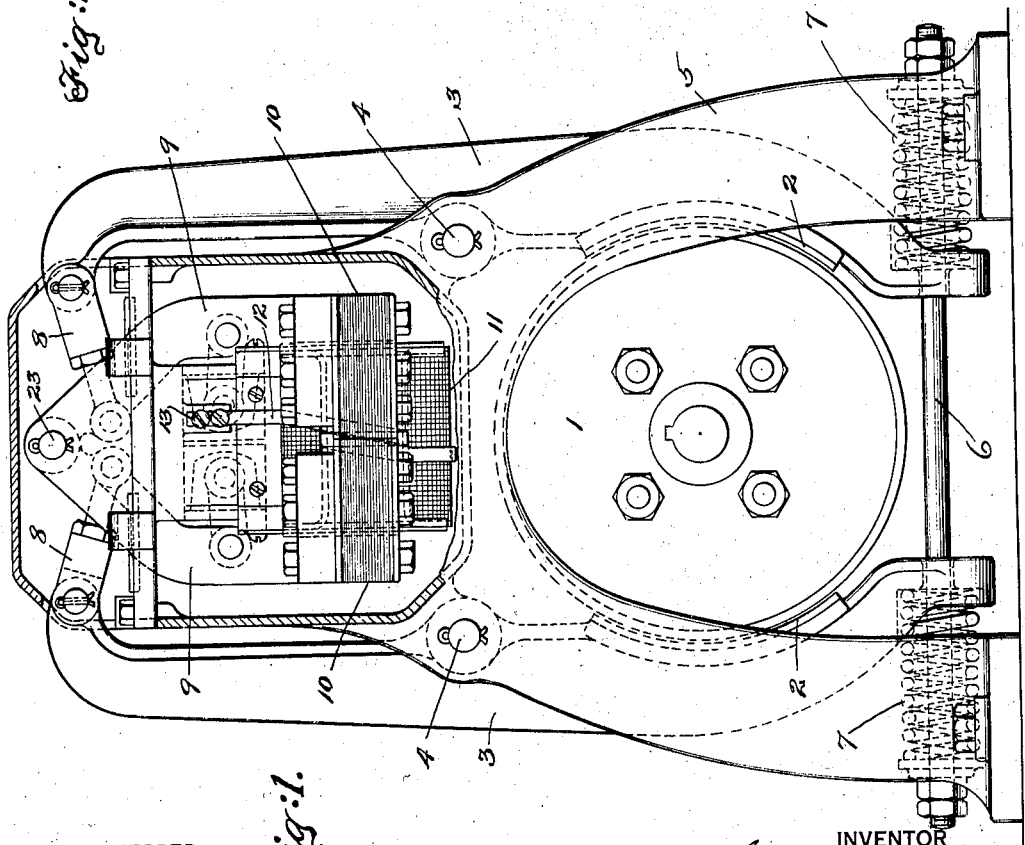
WITNESSES:
INVENTOR
David C. Larson.
BY L. H. Campbell
ATTORNEY D. C. LARSON.
ALTERNATING CURRENT ELECTROMAGNET.
APPLICATION FILED DEC. 1, 1915.
1,255,441.
Patented Feb. 5, 1918.
6 SHEETS—SHEET 2.
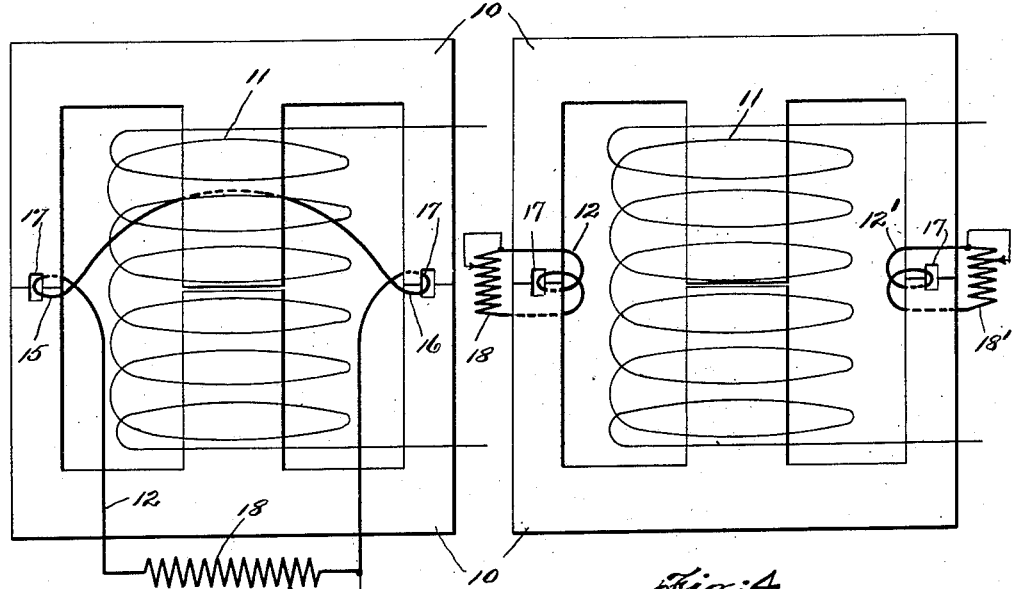
*Fig. 3.*  *Fig. 4.*
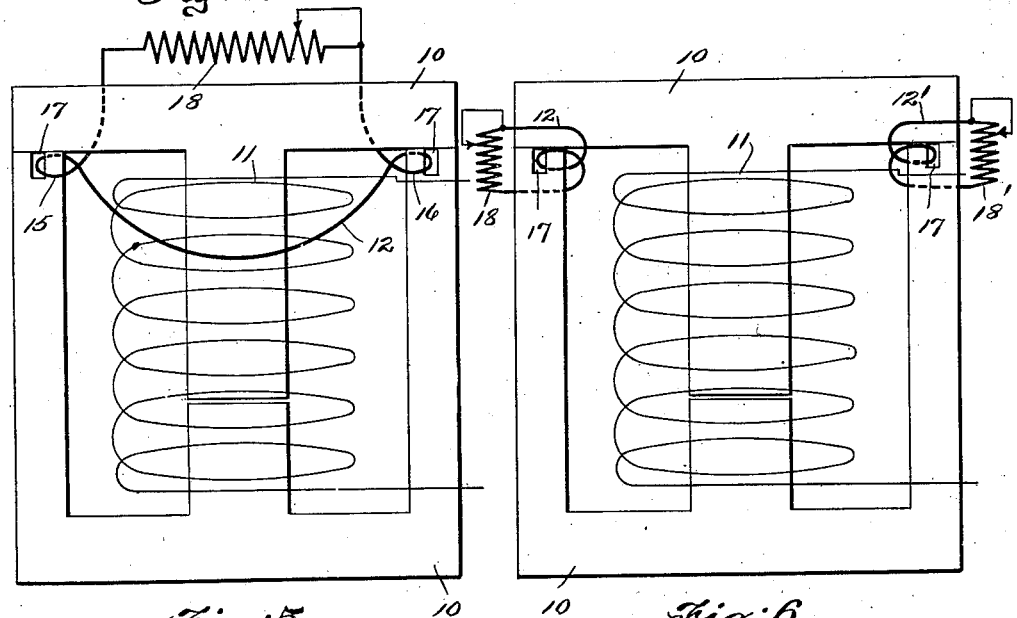
*Fig. 5.*  *Fig. 6.*
WITNESSES:
James G. Bothell
Walter C. Strang
INVENTOR
David C. Larson
BY
L. H. Campbell
ATTORNEY

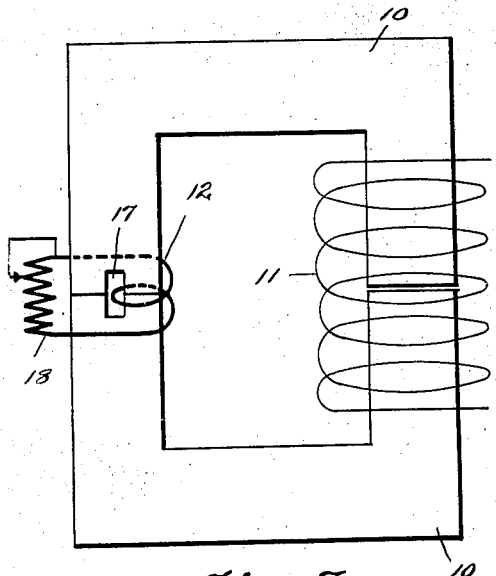
Fig: 7
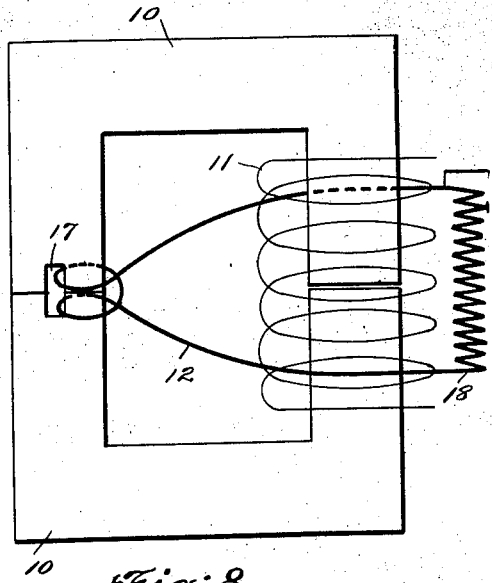
Fig: 8.
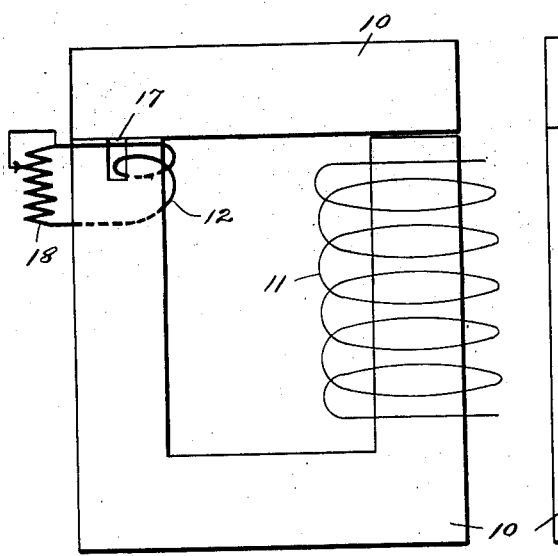
Fig: 9.
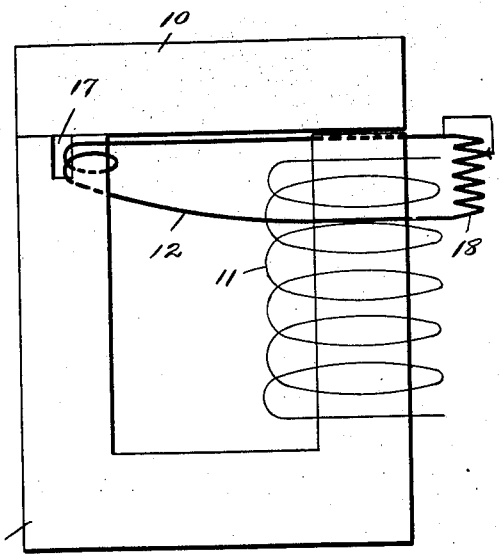
Fig: 10.

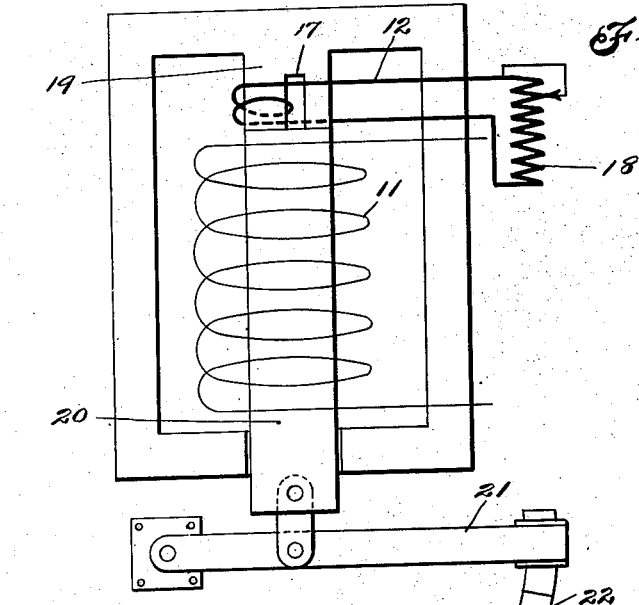
Fig: 11.
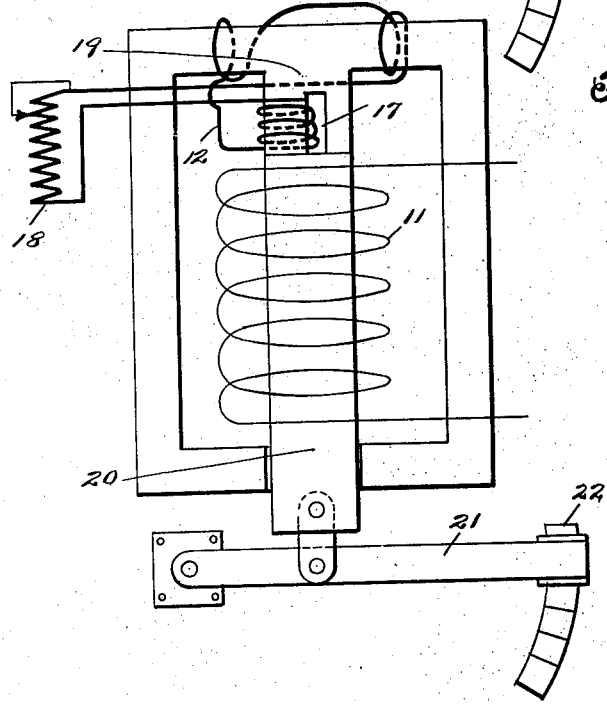
Fig: 12.

D. C. LARSON.
ALTERNATING CURRENT ELECTROMAGNET.
APPLICATION FILED DEC. 1, 1915.

1,255,441.

Patented Feb. 5, 1918.
6 SHEETS—SHEET 5.

WITNESSES:
James G. Bethell
Walter C. Strang

INVENTOR
David C. Larson
BY J. K. Campbell
ATTORNEY

D. C. LARSON.
ALTERNATING CURRENT ELECTROMAGNET.
APPLICATION FILED DEC. 1, 1915.
1,255,441.
Patented Feb. 5, 1918.
6 SHEETS—SHEET 6.
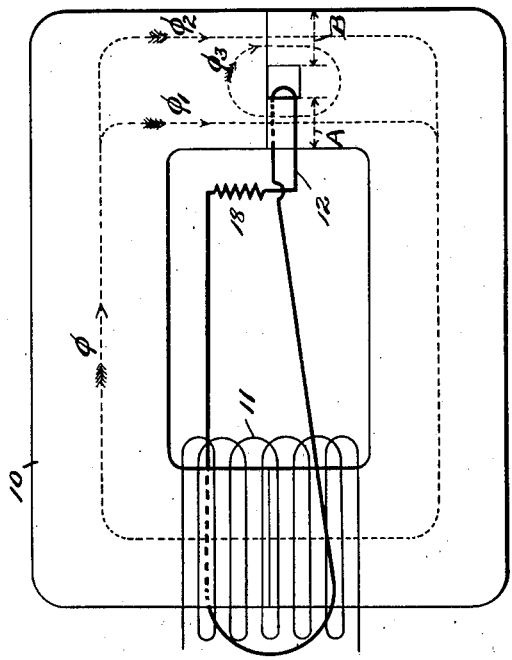
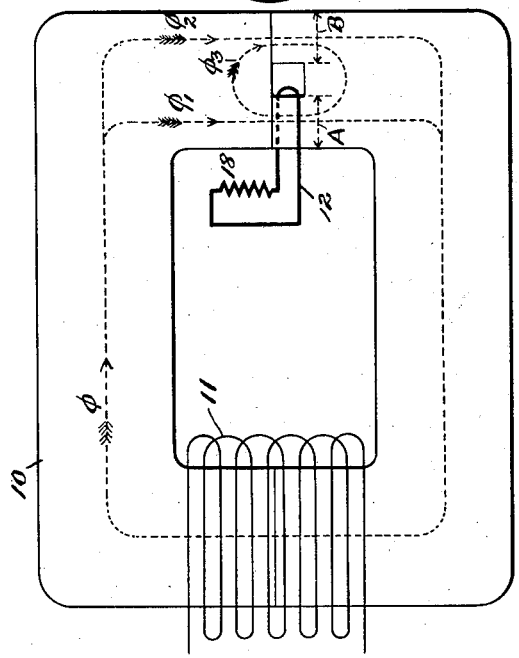
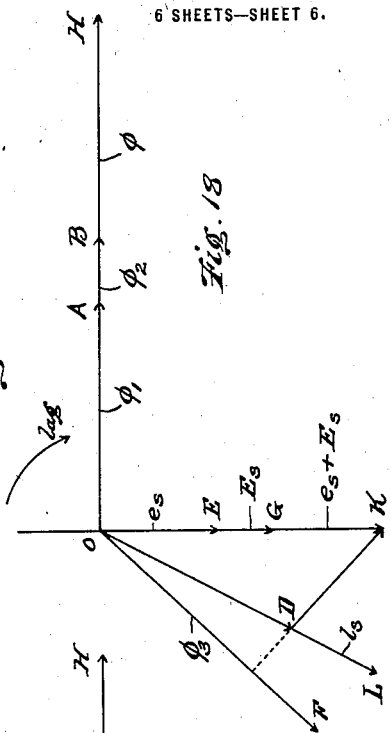
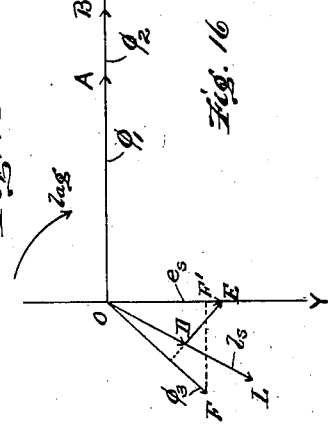
WITNESSES:
James G. Bethell
Ernest L. Gale, Jr.
INVENTOR
David C. Larson
BY L. N. Campbell
ATTORNEY

UNITED STATES PATENT OFFICE.

DAVID C. LARSON, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT ELECTROMAGNET.

1,255,441.   Specification of Letters Patent.   Patented Feb. 5, 1918.

Application filed December 1, 1915. Serial No. 64,446.

*To all whom it may concern:*

Be it known that I, DAVID C. LARSON, a citizen of the United States, residing in Yonkers, in the county of Westchester and State of New York, have invented a new and useful Improvement in Alternating-Current Electromagnets, of which the following is a specification.

The invention relates to an alternating current electromagnet comprising a core and primary and secondary conductors constructed and arranged so that magnetic fluxes different in phase are produced therein, whereby the traction effect never falls to zero and hence a constant pull is exerted which prevents chattering of the relatively movable parts of the magnet.

The invention consists in the proportioning of the secondary conductor, and in the construction and relative arrangement of the core and conductor.

An object of the invention is the provision of an alternating current electromagnet which is cheaply constructed and which will have great power with minimum current consumption.

Other objects of the invention will appear hereinafter, the novel combinations of elements being pointed out in the appended claims.

In the drawings, Figure 1 illustrates in front elevation an embodiment of my invention with brake apparatus; Fig. 2 is a side view of the same having one of the magnet cores removed; Fig. 3 is a diagrammatic view of the magnet of Fig. 1; Figs. 4 to 14, inclusive, are diagrammatic views showing various modifications of the invention; Fig. 15 illustrates a magnet with the usual arrangement of secondary winding or shading coil while Fig. 17 shows a similar magnet with the secondary winding arranged in accordance with my invention; Figs. 16 and 18 are vector diagrams applied to the magnets of Figs. 15 and 17, respectively.

Like reference characters denote similar parts in all of the figures.

Referring more particularly to Figs. 1 and 2, I show my invention applied to a magnet brake, such as is used in connection with an elevator; the brake being shown in released position with its magnet energized. The brake comprises a brake pulley 1 and a pair of oppositely disposed brake shoes 2—2, which are carried by brake levers 3—3 pivoted at 4—4, to an A frame 5. A rod 6 passes freely through the lower ends of the levers 3—3, and carries a pair of compression springs 7—7, which bear against the ends of the brake levers and normally force the brake shoes into contact with the periphery of the pulley 1. The upper end of each brake lever 3—3 is connected by an adjustable link 8 to one of a pair of dashpot controlled arms 9, 9, pivoted at their upper ends to a stationary rod 23. To the lower end of each of the arms 9, 9, are bolted or otherwise suitably secured a series of laminæ, 10, 10, which form the pole pieces or cores of an electromagnet. These pole pieces may be formed in many different ways and, as here shown, they are similar to each other and resemble in plan view the letter E as indicated in Fig. 3. A magnet coil 11 which comprises the primary winding incloses the center limbs of each of the pole pieces 10, 10, and the spool containing this winding is suitably supported in fixed position. The outer limbs of each of the pole pieces are slotted at 17 to receive a conductor 12 comprising the secondary winding which incloses a fractional part of the outer limbs of each of the pole pieces and also incloses the center limbs of the same.

In the particular embodiment of the invention shown in Figs. 1 and 2, the conductor 12 comprises a rectangular strip of copper, brass or other suitable conducting material. One end of the strip conductor is secured to the metal frame of the magnet by the screws 13, while the other end of the conductor is secured to the magnet frame by the screws 14. The intermediate portion of the conductor is looped substantially one turn about a portion of the adjacent polar extremities of the outer limbs of the pole pieces and the two loops 15 and 16 thus formed are wound in the same direction. The conductor also makes a half turn about the center limb of the pole pieces and, since the path of the current in the conductor is completed through the metal frame of the magnet, the conductor in effect makes a complete turn about the center limbs of the magnet and, as shown, this complete turn is wound in a direction opposite to that of the two loops inclosing the outer limbs of the magnet. While in this particular instance I have shown but a single turn about each of the adjacent polar extremities of the magnet, I contemplate using other than a single turn, depending largely upon the particular size and design of magnet and upon the use to which it may be put.

It will be observed that the conductor 12 is supported at either end so as to remain fixed in position, so that when the circuit to the magnet winding 11 is opened and the magnet cores become separated by the pull of the brake springs, the conductor 12 which forms the secondary winding no longer embraces the polar extremities of the magnet cores but remains unmoved within the air gap between the respective pole pieces. Upon energizing the primary winding, and before the pole pieces have moved to attracted position, the magnetic leakage is at a maximum and consequently the flux density in the secondary turns is at this time but a fraction of what it becomes after the cores have come into actual contact with each other. Hence it follows that the induced secondary current is relatively small upon first exciting the primary winding and therefore the initial magnetizing current supplied from the mains will be very much less than it would be if substantially all of the primary flux were inclosed by the secondary winding such as one finds in the prevailing types of split phase magnets. This feature is of practical importance, in that it effects a substantial saving of current, and minimizes the usual disturbing effects on the main line when the circuit to the magnet is first closed.

Referring to Fig. 3, I show a variable resistance element 18 connected in the circuit of the secondary conductor 12 by means of which the phase angle of the secondary current may be shifted and the flow of current controlled.

Fig. 4 discloses the same general form of magnet pole pieces as shown in Figs. 1, 2 and 3, with a different arrangement of the secondary winding. As here shown, the secondary winding comprises two separate parts 12 and 12', each part consisting of a turn within the slot 17 which incloses a fractional part of the flux, and a turn about the magnet limb which incloses all of the flux passing in the limb. The resistances 18 and 18' may be included in the circuit of each of the separate parts of the secondary 12 and 12' if desired.

Figs. 5 and 6 are very similar to Figs. 3 and 4, respectively, the chief points of difference lying in the particular form of magnet cores used, and in the location of the secondary windings. In these figures the magnet cores are made up of two unsymmetrical parts, while the secondary windings are moved up toward the top of the magnet core adjacent the contacting poles.

Figs. 7, 8, 9 and 10, are further modifications of the invention, and show a type of magnet of rectangular form in which the magnetic circuit induced by the primary winding is a single circuit as distinguished from the types of magnets shown in the preceding figures, in which the magnetic circuit induced by the primary winding is a divided or two part circuit.

Figure 13:
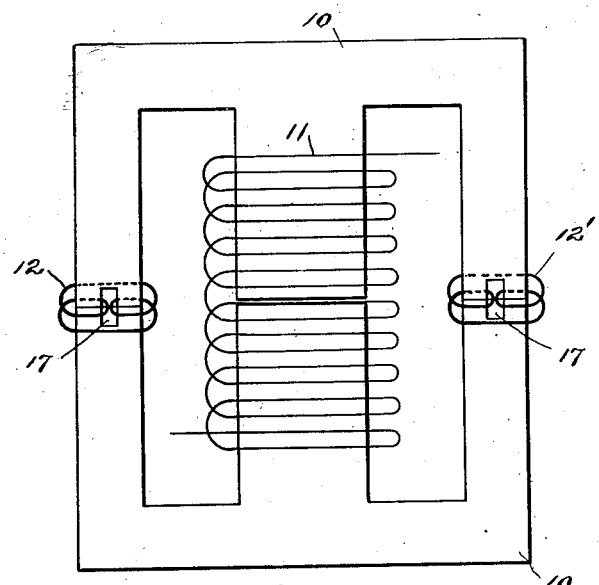

Figs. 7 and 9 are similar to Figs. 4 and 6, respectively, as regards the arrangement of the primary and secondary windings. Figs. 8 and 10 are very similar to Figs. 3 and 5, respectively, in that the secondary winding comprises two turns about a fractional part of the main flux and also one turn about all of the main flux.

Figs. 11 and 12 represent an embodiment of the invention in connection with a well known type of solenoid magnet having a fixed core 19 and a movable core or plunger 20 which may be connected to give movement to any desired mechanism such as the pivoted lever 21 adapted to move over a series of contacts 22. In Fig. 11, the secondary conductor 12 makes two complete turns about a fractional part of the polar extremity of the fixed core 19, and also one turn about the entire polar extremity. In Fig. 12, the secondary conductor makes several turns inclosing a fractional part of the flux in the fixed core 19, and substantially one turn about each branch of the magnet frame which constitutes a double return circuit for the magnetic flux.

In Fig. 13, the magnet pole pieces are arranged similar to those of Figs. 3 and 4, while the secondary winding comprises two conductively separate windings, each winding consisting of one or more turns within the slot 17 embracing separate core areas of equal section and wound in the same direction.

Figure 14:
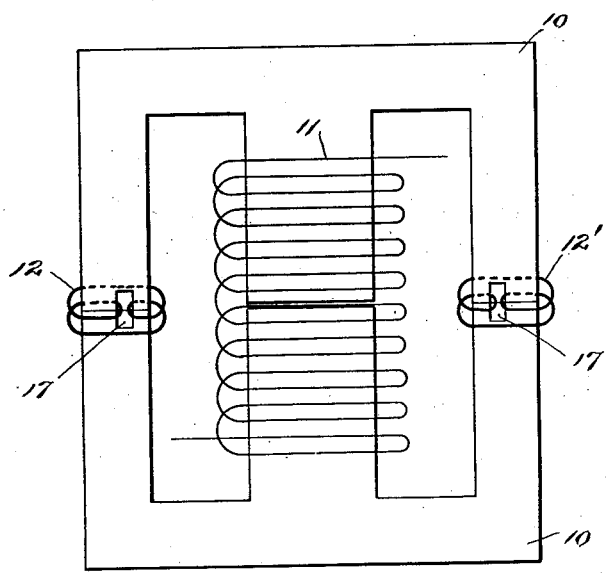

Fig. 14 is substantially like Fig. 13 excepting that the pole areas on either side of the slot 17 are unequal.

The improvements obtained by reason of my invention are best explained by means of vector diagrams applied to a split phase magnet having the usual shading coil and to a magnet embodying my invention. The former is shown in Fig. 15; its secondary 12, which has one or more turns, is wound on a horn A formed by milling a slot in the right hand pole face. The primary coil 11 has only negligible resistance, so that the flux $\varphi$ which links with this coil may be considered as being constant under all conditions. The flux $\varphi$ splits into a flux $\varphi_1$ passing through A and a flux $\varphi_2$ passing through the horn B, but the geometrical sum of $\varphi_1$ and $\varphi_2$ must always be equal to $\varphi$.

The areas A and B will be assumed to be equal so that with open secondary $\varphi_1$ and $\varphi_2$ are equal to one half of $\varphi$ and in phase therewith. The closed secondary, however, the current flowing through the secondary will set up in A a magneto-motive force opposed to the flux $\varphi_1$ and acting as a screen toward the passage of lines of force through A. As a consequence, the flux $\varphi$ will no longer be evenly divided over the areas A and B but the flux $\varphi_2$ passing through B will be larger than the flux $\varphi_1$ passing through A. Moreover these fluxes will no longer be in phase with the flux $\varphi$. These phase displacements are however so small that for all intents and purposes they may be assumed as if they were each in phase with $\varphi_1$, and as such in Fig. 16 OH will represent the phase $\varphi$ linking with the primary coil 11, OB represents the flux $\varphi_2$ and OA the flux $\varphi_1$.

The flux $\varphi_1$ linking with the secondary, induces therein the electro-motive force $e_s$ represented by the vector OE, also linked with the secondary only is the leakage flux $\varphi_3$ represented by the vector OF, which causes in the secondary an electro-motive force of self-induction ED perpendicular to OF. When further OL is the vector of the secondary current and OD represents the ohmic drop in the secondary, the triangle ODE expresses that the secondary induced electro-motive force OE is consumed by the electro-motive force of self-induction ED and the ohmic drop OD.

At instances at which the main flux $\varphi$ is zero, $\varphi_1$ and $\varphi_2$ will also be zero, so that at such instances the only flux which holds the armature sealed against the stationary part of the magnet is the secondary leakage flux $\varphi_3$ of which the instantaneous value will then be represented by OF', the projection of OF on the axis OY. In order to obtain therefore as large as possible a noiseless pull, we must evidently endeavor, for a given angle FOL, to make the flux $\varphi_3$ as large as possible.

Clearly nothing can be gained by increasing the number of secondary turns, for, while the secondary induced electro-motive force will be proportional to the number of turns, the flux is inverted proportional thereto.

It will therefore be seen that for a given magnet frame and a given primary excitation, the greatest possible noiseless pull is absolutely fixed. As is well known this pull is comparatively small and when a large noiseless pull is desired unusually large and expensive magnet frames are required.

The principal object of my invention is not only to obtain a greater noiseless pull than has heretofore been possible with a given magnet frame and a given primary excitation, but also to vary this pull at will.

For this purpose I construct my secondary as, for example, in Fig. 17, having as in the previous example, one turn around the horn A, which is connected in series with another turn around the primary coil. Both turns are so connected that the electro-motive forces induced in them sum up.

Assuming the same primary excitation as with the ordinary split phase magnet of Fig. 15, OH (Fig. 18) will again be the vector of the total flux linking with the primary coil which splits into the flux $OA = \varphi_1$ passing through A and the flux $OB = \varphi_2$ passing through B. As before the flux $\varphi_1$ linking with the secondary turn will induce therein the electro-motive force OE lagging 90° behind OH. The secondary turn around the primary coil links with the total flux OH and induces therein the electro-motive force $OG = E_s$ in phase with $e_s$. The total electro-motive force in the secondary is therefore $e_s + E_s$ represented by the vector OK. The fundamental difference with the usual arrangement of secondary is now evident. In that case the secondary leakage flux $\varphi_3$ corresponded to the electro-motive force $l_s$ and one single secondary turn. In the present case we have also one single turn which links with the leakage flux $\varphi_3$, but the electro-motive force will now be $e_s + E_s$. Other conditions being the same, the flux $\varphi_3$ with my arrangement will be larger in the ratio $$\frac{e_s + E_s}{e_s},$$

and since the pulls are proportional to the square of the flux, the noiseless pull with my invention will be larger in the ratio $$\left(\frac{e_s + E_s}{e_s}\right)^2$$

with the same magnet frame and the same primary excitation.

In Fig. 18, I have assumed a single secondary turn around the primary in which is induced the electro-motive force $E_s$. Had I taken $n$ such turns and connected them in series with a single secondary turn around the horn A, the total induced secondary electro-motive force would have been $e_s + nE_s$ and comparing again with the ordinary arrangement of shading coil under otherwise the same conditions, the secondary leakage flux would have been greater by the ratio $$\frac{e_s + nE_s}{e_s}$$

and the noiseless pull would have increased by the ratio $$\left(\frac{e_s + nE_s}{e_s}\right)^2.$$

It will therefore be clear that with my invention I obtain not only a larger noiseless pull than is heretofore possible, but that by increasing the number of secondary turns around the total primary flux I am in a position to adjust this pull to the require-
ments of the case.

I find that by reason of the novel arrangement of the secondary conductor shown in the various figures, I am enabled to produce a magnet having a far greater economy and a much greater pull with a given exciting current, than one arranged in any of the known ways. Furthermore, a magnet constructed according to my invention may be built at a fraction of the cost of the usual form of magnet, since the pull is so great and the phase splitting so perfect that the pole pieces do not have to be carefully fitted and hence a large amount of labor may be saved.

Without limiting myself to the precise construction and arrangement of parts herein disclosed, what I claim is:—

1. An alternating current electromagnet comprising a core, a primary winding, and a secondary conductor having a portion inclosing the total flux in said core and another portion inclosing a fractional portion only of the flux.

2. An alternating current electromagnet comprising a primary winding, and a secondary winding having a turn inclosing the main flux and another turn inclosing a portion only of said flux, said secondary turns being connected in series with each other.

3. An alternating current electromagnet of the type set forth comprising a core having a recess in its polar extremity, a primary coil, and a secondary winding having a turn, in said recess and another turn around the primary.

4. An alternating current electromagnet of the type set forth comprising a magnet core having a recess in its polar extremity, a primary coil, and a secondary winding comprising a turn in said recess and a turn around the primary, said turns being connected in series.

5. An alternating current electromagnet of the type set forth comprising a magnet core having a recess in its polar extremity, a primary coil, and a secondary winding comprising a turn in said recess and a turn around the primary, said turns being so connected that their induced electro-motive forces sum up.

6. An alternating current electromagnet of the type set forth comprising a magnet core having a recess in its polar extremity, a primary coil, and a secondary winding comprising a turn in said recess and a turn around the primary, said turns being so connected that their induced electro-motive forces act cumulatively.

7. An alternating current electromagnet comprising a primary winding, and a secondary winding having a turn inclosing the main flux and another turn inclosing a fractional part only of the main flux, said turns being connected in series with each other so that their induced electromotive forces sum up.

8. An alternating current electromagnet comprising a primary winding, and a secondary or shading coil having series connected portions, one of which incloses the total flux and another of which incloses a portion only of the total flux.

9. In an alternating current magnet, a secondary circuit, comprised of several turns adapted to inclose substantially the total primary flux in the core of the magnet and a primary turn adapted to inclose substantially only a fractional portion of the flux.

In testimony whereof I have signed my name to this specification in the presence of two subscribing witnesses.

DAVID C. LARSON.

Witnesses:
 WALTER C. STRANG,
 JAMES G. BETHELL.